US008239362B1

(12) United States Patent
Frazier

(10) Patent No.: US 8,239,362 B1
(45) Date of Patent: Aug. 7, 2012

(54) USING METADATA FRAGMENTS AS AUTHORITATIVE MANUFACTURING WORK INSTRUCTIONS

(75) Inventor: Gerald S. Frazier, Kent, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 12/813,915

(22) Filed: Jun. 11, 2010

(51) Int. Cl.
G06F 17/30 (2006.01)
(52) U.S. Cl. ........ 707/706; 707/602; 707/601; 707/768; 707/705; 707/754; 709/201; 709/203; 709/217; 709/219
(58) Field of Classification Search .................. 707/600, 707/601, 602, 705–706, 754, 768; 709/201–203, 709/217, 219
See application file for complete search history.

(56) References Cited

U.S. PATENT DOCUMENTS

| 7,031,893 | B2 | 4/2006 | Gupta et al. | |
|---|---|---|---|---|
| 2006/0079989 | A1 | 4/2006 | Ishii et al. | |
| 2006/0129262 | A1 | 6/2006 | Zayic et al. | |
| 2006/0129970 | A1 | 6/2006 | Haas et al. | |
| 2008/0187897 | A1* | 8/2008 | Franzen et al. | 434/350 |
| 2009/0043753 | A1* | 2/2009 | Elango et al. | 707/5 |
| 2010/0262615 | A1* | 10/2010 | Oztekin et al. | 707/768 |
| 2011/0131139 | A1* | 6/2011 | Gregory et al. | 705/301 |
| 2011/0313992 | A1* | 12/2011 | Groeneveld et al. | 707/706 |

FOREIGN PATENT DOCUMENTS

| EP | 0985992 A2 | 3/2000 |
|---|---|---|
| EP | 1785797 A2 | 5/2007 |

* cited by examiner

*Primary Examiner* — Frantz Coby
(74) *Attorney, Agent, or Firm* — Caven & Aghevli LLC

(57) ABSTRACT

Systems and methods are described for authoritative manufacturing work instructions. Where work instructions, engineering definition and engineering specification standards are integrated as a single set of authoritative work instructions with embedded engineering definition and standards data. This method describes a work instruction authoring system that re-uses engineering product and process specification definition and authority then combines manufacturing work instructions to produce enhanced manufacturing work instruction operations that contain authoritative specification data as reusable dynamic elements of the engineering definition and process specifications. Work instructions can be created using the authority obtained from the engineering product and specification standards, the work instructions can deliver the authoritative engineering definition and process specification standards data as an integrated element of standardized work instructions. The intent is to have an integrated seamless process specification and work instruction library of managed standards through a single system or enterprise library.

20 Claims, 13 Drawing Sheets

USING METADATA FRAGMENTS AS AUTHORITATIVE MANUFACTURING WORK INSTRUCTIONS

TECHNICAL FIELD

The present invention relates to manufacturing work instructions, engineering product definitions and engineering specification standards that are integrated as a single set of authoritative manufacturing work instructions with embedded engineering definition and standards data and more specifically, techniques to define and deliver authoritative manufacturing work instructions.

BACKGROUND

The use of manufacturing work instructions is an important aspect of the manufacturing process. However, manufacturing work instructions are not managed within a common business system or enterprise library. Typical existing work instruction processes are very labor intensive, i.e. current text based work instruction systems are manually created and maintained. Therefore, when the engineering definition and engineering process specifications change, manufacturing work instruction library administrators must assess the impact of each change and manually modify the text based work instructions within the product specific work instruction library and update all manufacturing process plans impacted by an engineering change.

Current manufacturing work instruction authoring systems also refer to the engineering process specification authority documents using terms like: "in accordance with" for each branch or leaf found within a specific engineering specification family or hierarchy.

In referencing authority documents in this manner, a user must reference and cross-reference the same document or set of documents multiple times, which takes additional time and effort, e.g., current systems replicate engineering definition and process specification requirements using similar text, lacking any direct link or active link to the source engineering authority document. Frequently, it is difficult to locate copies of the cross-referenced documents resulting in additional inefficiencies. Consequently, existing manufacturing work instruction systems lack the object linking behavior that would qualify the data as being authoritative.

This existing method is inefficient and typically results in inaccurate or obsolete work instructions being delivered to the factory floor, which adversely affects the quality and configuration of the product and it results in delay, rework and manufacturing errors.

Further, the engineering process specification documents used, in part, to develop the manufacturing work instructions are typically managed within an isolated content management system. Engineering process specification documents are typically text based and also contain illustrations, tables, and graphics that are not formatted or structured for reuse.

SUMMARY

The authoritative manufacturing work instruction authoring system uses multiple topic lists and document tag referencing when creating a structured extensible markup language (XML) library by converting a set of documents from a typical text based set of documents to a structured topic library. Manufacturing Work Instructions can be derived from this library using topic filters to define the manufacturing process to be completed. A search engine and data service may then be used to apply the filter criteria to identify reusable fragments of the content from the library. The filtered fragments may then be sequenced and applied to a work instruction that is used to define a manufacturing process.

The features, functions, and advantages may be independently achievable in various embodiments of the present disclosure or combinable in yet other embodiments.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
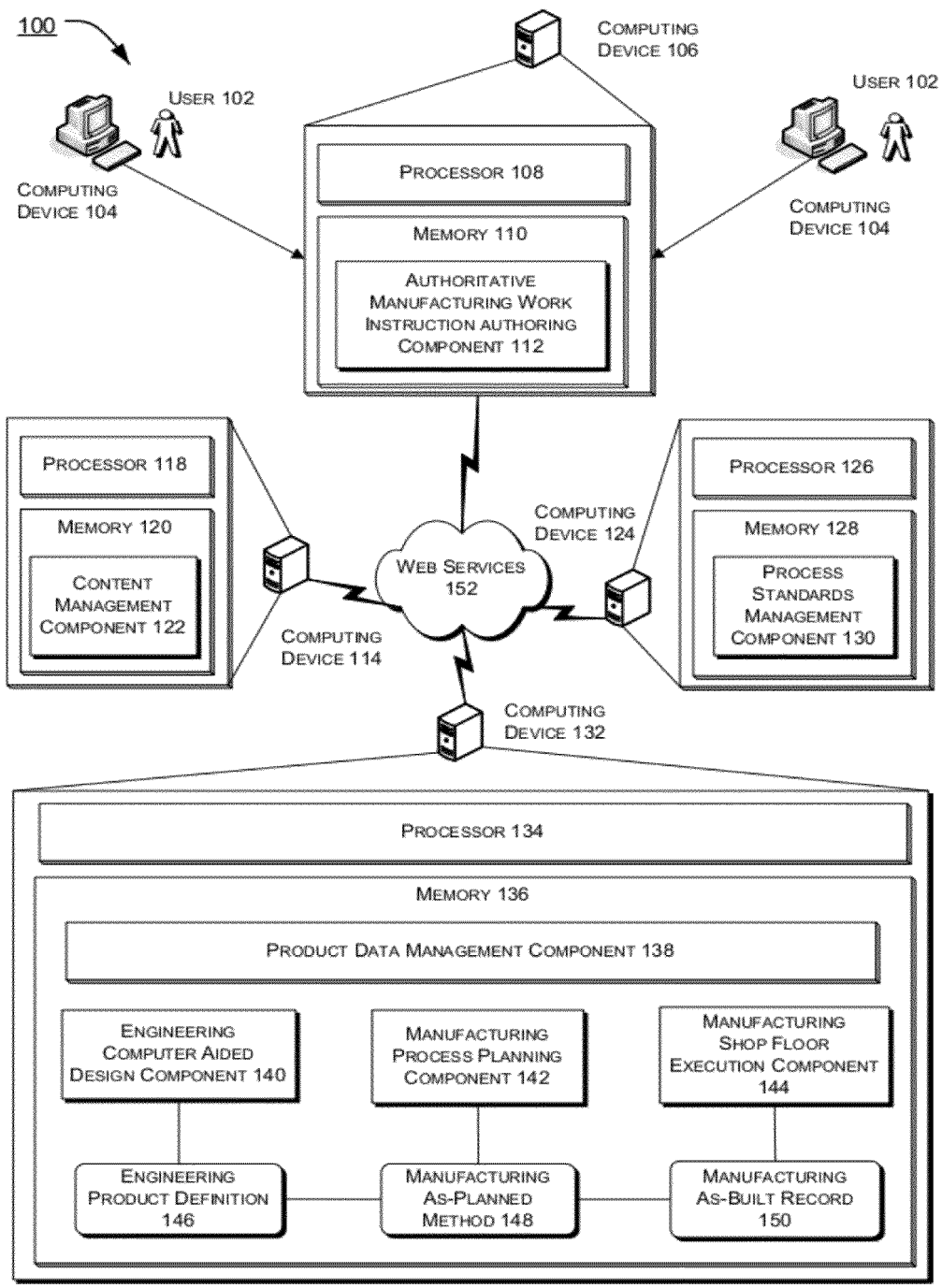
FIG. 1 is a block diagram illustrating a simplified architecture of the authoritative work instruction authoring system.

Methods and systems are described that use authoritative engineering process specification requirements data by applying a dynamic search engine to search any document to find specific text based content that has been or can be, tagged with a text string index identifier from a predefined as a list of topic names. The engineering process specification requirements may be created in a new way to manage, store and deliver search string information to the authoritative work instruction system using advancements in extensible markup language (XML). Specific text based content returned by a search engine uses metadata fragments from engineering process specification in the construction of manufacturing work instructions. Thus, the process to define the authoritative work instructions for a manufacturing process or processes reuses engineering metadata fragments to create such instructions. The structured and unstructured engineering process specification metadata is used in the derivation of the work instructions by mining the attributes and values within the engineering product definitions or engineering process specifications. The capturing of the fragments may be conducted in real time thus providing up-to-date and accurate work instructions at any point in time.

The authoritative manufacturing work instruction authoring system is utilized to produce a new type of authoritative work instruction that retrieves and displays text, illustrations, graphics, tables, attributes and other values directly from the source document by displaying the filtered results on demand in real time or near real time. Each document searched provides the structure of the index engine criteria including the sequence in which it was created. The search engine uses the authoritative engineering process specification requirements data by applying a dynamic search engine to search any document type to find specific text based content that has been predefined as a list of "Topic Names". The authoritative manufacturing work instruction authoring system shall contain Four Topic lists. Each topic list will be used to facilitate the use and creation of a topic query. The Structured Topic library will be comprised of "Topic Queries" from one or more topic list. The structured topic library content is based on the single subject document or multiple documents. The four types of Topic List are as follows:

Structured Engineering Topic List;
Structured Manufacturing Topic List;
Combined Engineering and Manufacturing Index List;
Topic Trigger Index List.

The resulting active search query may be stored as a unique index of the search criteria that includes the index history of the document being searched and the part or parts of the document that make up the query may be based on the initial topic list.

Each topic based query may use one or more topic index queries to, singularly or in a combined topic string, merge together fragments of information to create work instructions.

The following four methods encompass increasing levels of technology that are used to author and administer the creation and maintenance of standardized work instructions that reuse and deliver the engineering process specification authority data as part of providing standardized work instructions to manufacturing engineers.

Method 1: Text with matched static specification data. This method includes work instruction text & manually created documents of filtered engineering process specifications.

Method 2: Text with variable specification data filters. This method includes work instruction text & manual parametric values to filter engineering process specifications.

Method 3: Text with scripted variable and mined specification data filters. Includes work instruction text & automated scripts to mine parametric values to filter engineering process specifications.

Method 4: Text with automated variable and mined specification data filters. Includes work instruction text & the use of knowledge-based tools to filter engineering process specifications.

Methods 1 and 2 require an intensive level of maintenance, while methods 3 and 4 require a moderate and low level of maintenance, respectively. Additionally, the system provides an optional selection process that allows for the selection of one of the methods 1, 2 3, or 4 depending on the factors existing in a particular project. This writing will concentrate primarily on method 4; however, since each of the methods builds on the other, method 4 encompasses aspects of methods 1, 2 and 3.

A brief overview of the system is provided before proceeding to the figures. This innovation describes the derivation of work instructions directly from structured and unstructured engineering process specification metadata by mining the attributes and values within the engineering product definition.

This system and method dynamically captures and re-uses the metadata fragments of the engineering specifications and their re-use within the engineering product definition. The proposed approach is to develop a library of structured work instructions as XML based topics (structured topics) that combine specified data elements into filtered views (see FIG. 4). These filtered views are reusable as work instructions with rich structured content with associated infrastructure that provides authority process specification data to production systems.

This system and method will enable the re-use of specification data. The direct re-use of specification data was not possible in the past. It is now possible to create filtered views of a specification and include or exclude specification data based on need within the guidelines and rules that govern the logical re-use of key words, sentences, sections, paragraphs, table values and figures.

Engineering specifications that have been re-formatted into a structured extensible markup language (XML) based library can be delivered in any document format (e.g., Adobe Acrobat® portable document format (PDF), etc.) just as they have been the past; however, the flexibility to re-use of the specification data has been made available via XML.

It should also be noted that the ability to extract portions of the specification are driven by the XML tagging, rather than via references to sections, paragraphs, etc. Additional, XML tagging is necessary to be able to deliver work instructions that contain detailed fragments of specification data.

This capability enables a new generation of data mining (extraction of data/values from a source) that significantly enhances the ability to create and author work instructions that include filtered views of specification data and provide extended re-use of such data directly to the factory floor.

A "library" of structured standards with associated infrastructure provides authority process specification data to production and this is a significant advancement in the evolution of knowledge and data re-use.

Figure 4:
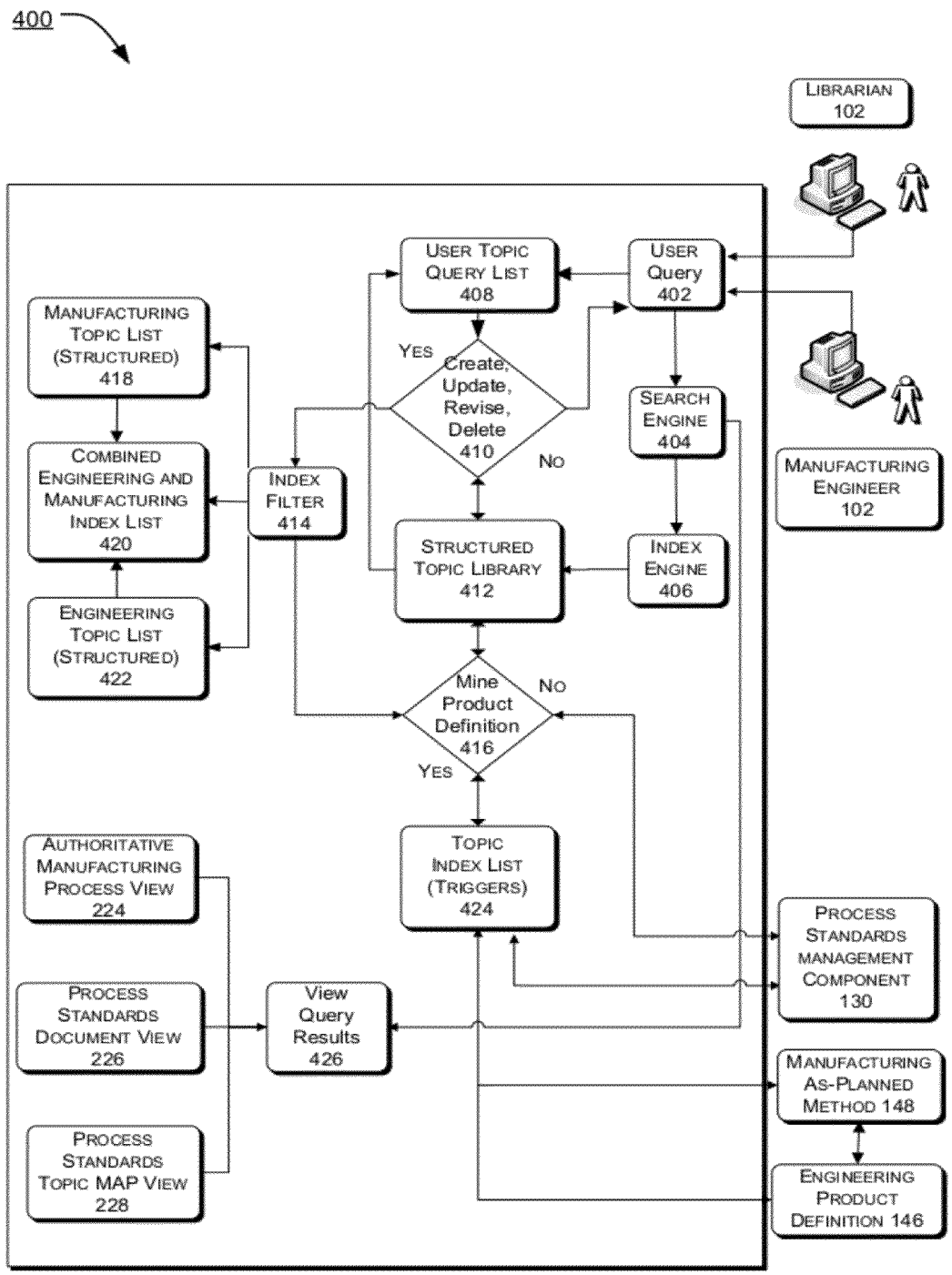
FIG. 4 is a block diagram illustrating the authoritative work instruction authoring system from the perspective of the librarian and manufacturing engineer roles.

The framework architecture used to create and deliver standardized work instructions, which reuse and deliver the engineering process specification authority data as part of the work instructions, is more fully described in FIG. 4; however, a short higher level summary is provided at this point to more fully understand the general concept.

A manufacturing engineer, or other user, logs into the product data management component. A new "manufacturing plan" is created and the engineer then adds a "standard process" from the library. The manufacturing plan will include a manufacturing process to be completed as the manufacturing plan is implemented. The engineer uses the engineering definition (as filter criteria) to define the work to be done, the engineer accesses the "structured topic library" to apply a filter criteria to search for an existing "standard process", the web services allows the engineer to filter on a process category and then selects the "standard process". The engineer previews the "standard process" to view the "operations" and related "resource requirements"; if necessary, the engineer may compare the manufacturing process against the product requirements and engineering process specifications to verify all requirements for this manufacturing process has been accounted for. The engineer selects and applies the standard process to the manufacturing plan. If the engineer discovers that the "standard process" is missing a requirement or process step, the engineer may request that the "standard process" be updated or a new version of the "standard process"

can be requested. The system "librarian" would assist in updating or creating the "standard process" (validated and released through the change board) and then notifies the engineer when the "standard process" is available. The engineer would proceed as normal to apply the standard process to the manufacturing plan.

A librarian logs into the authoritative work instruction authoring system. A new "standard manufacturing process" is requested and the librarian now wants to add a new "standard process" to the library. The librarian uses the input from the manufacturing engineer and the provided engineering definition and process specifications (as filter criteria) to define the process to be created. The librarian accesses the "structured topic library" to apply a filter criterion to search for an existing "standard process". The web service allows the librarian to filter on a process category and then select the "standard process". The engineer previews the "Standard Process" to view the "operations" and related "resource requirements". If necessary, the librarian may compare the manufacturing process against the product requirements and engineering process specifications to verify all requirements for this manufacturing process has been accounted for. The librarian uses the XML application software to apply attribute filters using the provided manufacturing process attributes, engineering product attributes and engineering process specification attributes, these fragments of XML data are combined into an XML string that is stored as a reusable set of XML proxy objects, each proxy object retains a link back to its origin.

Illustrative Architecture

FIG. 1 illustrates simplified implementation architecture for the authoritative manufacturing work instruction system 100. The system includes users 102 and computing devices 104. The users 102 may include a librarian and a manufacturing engineer whose roles will be more fully defined in the discussions with respect to FIGS. 2-4. Each of the users 102 may use a computing device 104 to provide input and/or to provide management and administration of the system. The librarian manages, maintains and processes the system content. The manufacturing engineer may use the structure and context of the system content to create the work instructions.

Computing device 106 includes one or more processors 108 and memory 110. An authoritative manufacturing work instruction authoring component 112 combines text based work instructions with embedded engineering specification data as a method of defining manufacturing process work instructions by capturing the topic structure threads hidden within an authoritative source of documents, metadata and engineering data without breaking the links or relationships to the source.

Computing device 114 includes one or more processors 118 and memory 120. The content management component 122 may be used to collect, manage and publish information content. The content may be stored as components or fragments of documents or whole documents. The links between the document fragments must be maintained at all times during the process.

Computing device 124 includes one or more processors 126 and memory 128. The process standards management component 130 is used to collect and manage a set of technical requirements, procedures or methods documents for common and repeated use in the design, development, production and/or support of a product.

Computing device 132 includes one or more processors 134 and memory 136. The product data management component 138 is a computer based application tool designed for the management and classification of design data and specifications for an engineered product and the management of change to this information. The product data management component 138 includes an engineering computer aided design component 140, a manufacturing process planning component 142 and a manufacturing shop floor execution component 144. The engineering computer aided design component 140 may be customized software or commercial off-the-shelf software that may be used to define, design and/or manage electronic models and/or drawings of a part, product or a system. A manufacturing process planning component 142 may be comprised of a combination of people (resources), procedures, methods, machines, materials, measurement equipment and/or environment for specific work activities to produce a given product or service. The manufacturing shop floor execution component 144 may be customized software or commercial off-the-shelf that may be used to deliver, manage and execute shop floor work instructions during the production of a product.

The engineering product definition 146, the manufacturing as-planned method 148 and the manufacturing as-build record 150 are used in the product data management component 138 as portions of the engineering computer aided design component 140, the manufacturing process planning component 142 and the manufacturing shop floor execution component 144. The engineering product definition 140 references technical requirements, procedures or methods documented for common and repeated use in the design, development, production, or support of a product. The manufacturing as-planned method 148 represents the planned product baseline configuration of a specific part or product as defined by the program and site manufacturing work instructions, which list the product definition configuration and revision level to be built. The manufacturing as-built record 150 represents the configuration of a specific part or identifying number and affectivity reflected by the complete manufacturing instructions that list the product definition data and associated revision levels and include inspection and/or verification certificates.

Computing devices 106, 114, 124 and 132 are joined together by data web services 152. Web Services 152 may include data broker or web services that are platform neutral and use vendor independent protocols that enable distributed processing to be performed using XML and web based technologies.

The Librarian Role

Figure 2:
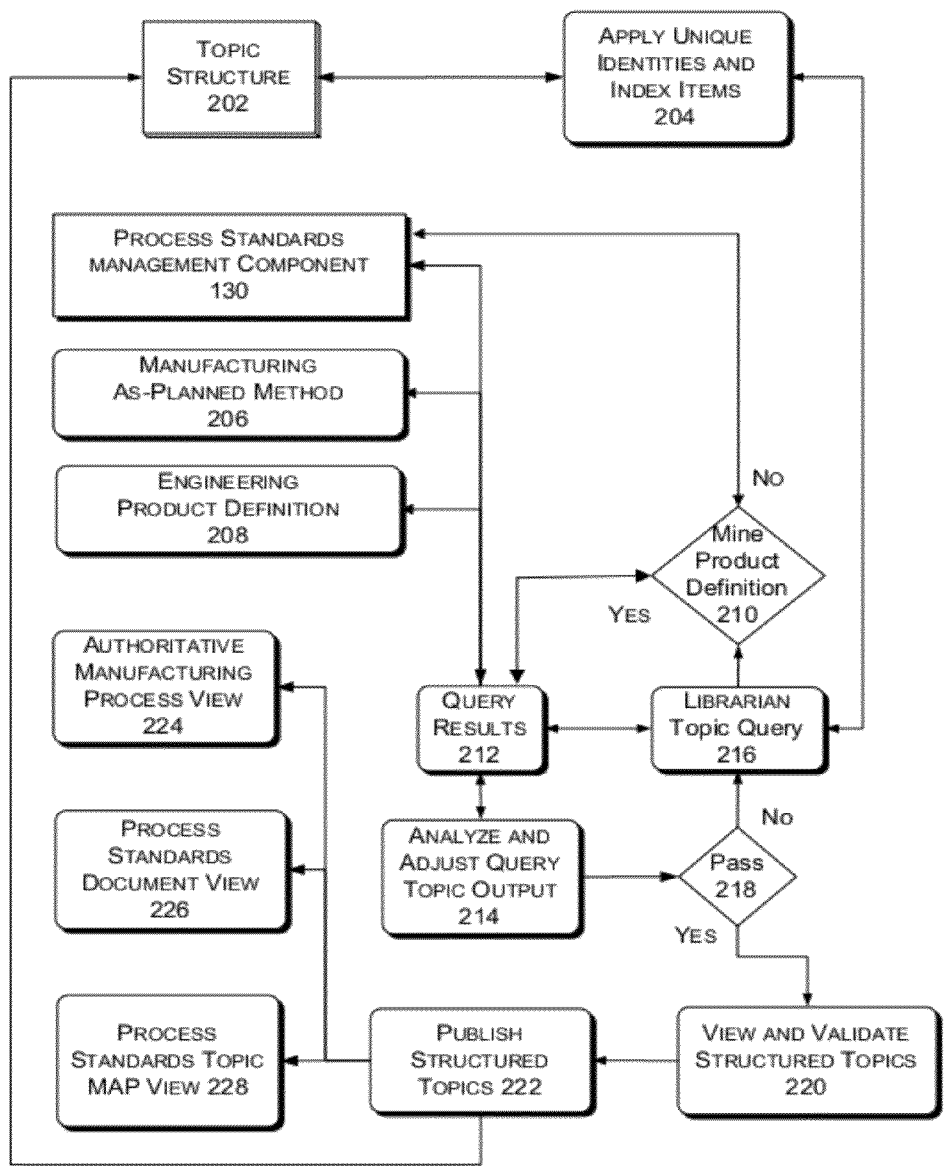
FIG. 2 is a block diagram illustrating the authoritative work instruction authoring system from the perspective of the librarian role.

FIG. 2 illustrates the librarian role 200 in the authoritative work instruction authoring system of FIG. 1. A topic structure 202 is created from metadata in the process standard management system 130. The librarian would typically log into the work instruction authoring system and create a new query and filter the metadata content using a search engine. Some type of platform neutral web service may be used to interact with the process standards management system 130. A manufacturing as-planned method 206 and an engineering product definition 208 may also be accessed in addition to the process standards management system 130 to assist in refining the queries and filters.

The system applies unique identities and indexes query filter items 204. At this point, the test queries may be refined to target the process standards topic definition list using a librarian topic query 216. The product definition is mined 210 to create topic filters for process and product query variables. If no filters are created, the system goes back to the process standards management system 130 through a web service to collect additional information and the system begins again. If filters are identified, a web service may again be used to review query results 212 and refine all possible filter combinations. The filters are analyzed and a query topic output 214 is adjusted. This process captures the query filter topic combinations for valid product and process standards topic threads. If the query filter topic combinations pass 218 the requirements for the particular project, the resulting structured topics are viewed and validated 220. In a preferred embodiment, the output is validated as XML, PDF and Topic MAP output. After validation, the structured topics are published 222 and viewed according to a selected format. In this embodiment, the process standards Topic MAP view 228 displays the Topic MAP output, the process standards document view 226 displays the PDF output and the authoritative manufacturing process view 224 displays the XML output.

If the query topic output 214 does not pass 218, the system returns to the librarian topic query 216 and the system applies additional unique identities and index items 204 and begins again at query results 212 to refine valid possible combinations. The system then follows the procedure described above again until the structured topics are validated 220.

The Manufacturing Engineer Role

Figure 3:
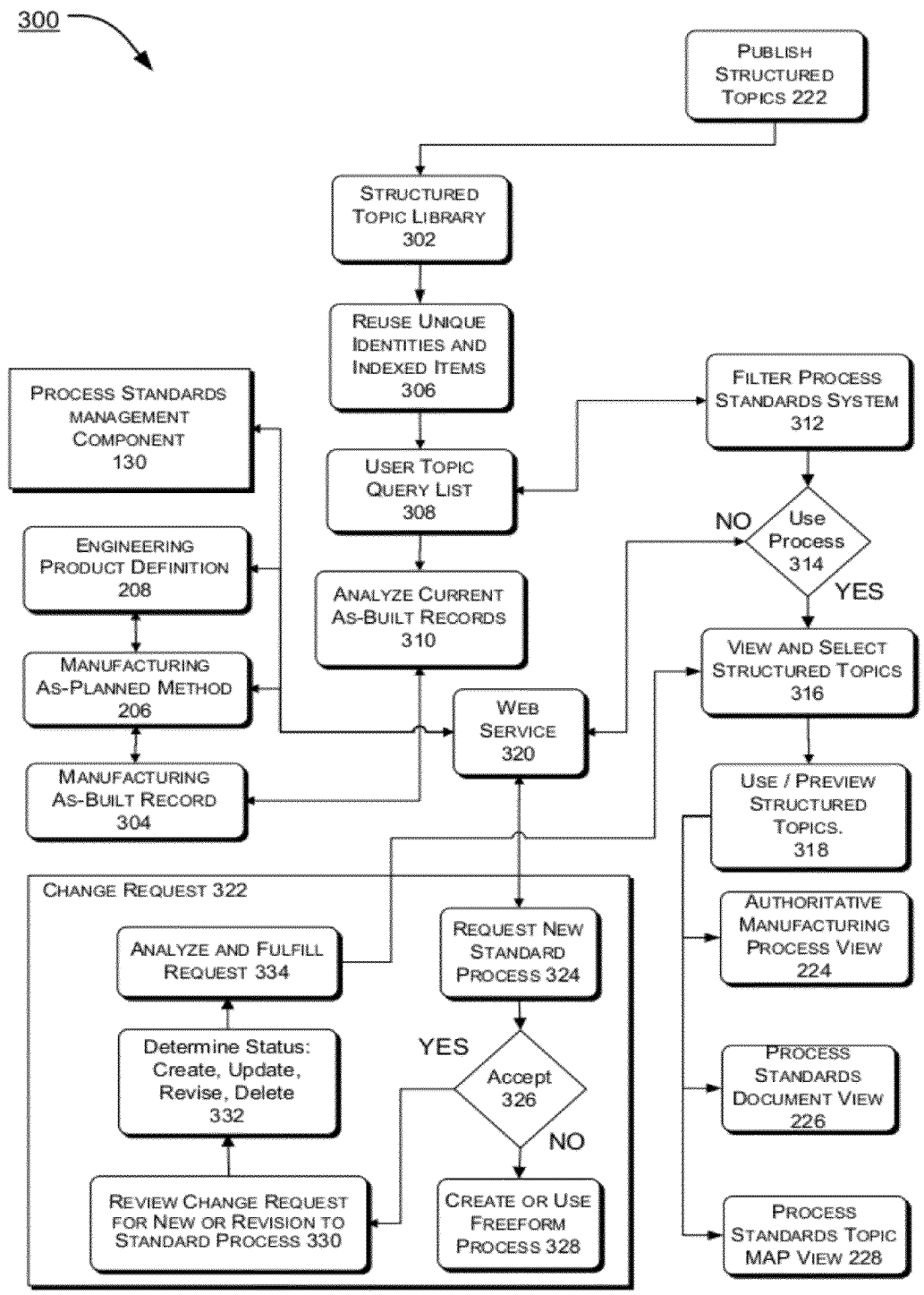
FIG. 3 is a block diagram illustrating the authoritative work instruction authoring system from the perspective of the manufacturing engineer role.

FIG. 3 illustrates the manufacturing engineer role 300 in the authoritative work instruction authoring system of FIG. 1. The manufacturing engineer role begins after the structured topics have been published 222. The manufacturing engineer would typically log into the work instruction authoring system and browse and select a topic from the structured topic library 302. In a preferred embodiment, the topic content may be filtered using a user query search engine and a web service may be employed to interact with the process standards management component 130. Some type of platform neutral web service may be used to interact with the process standards management system 130. The manufacturing as-planned method 206 and the engineering product definition 208 may also be accessed along with the process standards management system 130 to assist in refining the queries and filters based on history and lessons learned.

The system allows for the reuse of unique identities and indexed items 306 with the user being able to refine the query list to target process standards topic definitions by accessing the user topic query list 308. Optionally, the system may be used to analyze current as-built records 310. By analyzing the quality and effectiveness of the current as-built records, the system may be used to analyze lessons learned and update or maintain as planned methods to improve the processes within the system.

The system also implements a filter process standards system 312. The filter process standards system 312 filters process standard topics based on valid manufacturing methods using product and process query variables. The system makes a determination on whether to use the process 314. If it is determined that the process should not be used, the system initiates a change request 322. If it is determined that the process should be used, the system proceeds to view and select structured topics 316 by analyzing the topic structure of available process standards and manufacturing methods and determining whether a change request 322 may be used. The system then previews the structured topics 318. In a preferred embodiment, the valid structured topics are previewed as XML, PDF and Topic MAP output. This is represented in FIG. 3 as authoritative manufacturing process view 224 (XML), process standards document view 226 (PDF) and process standards Topic MAP view 228 (Topic MAP).

A change request 322 may be used, either because the process 314 is not used or the process is used and a determination is made that a change request may be desired. In a preferred embodiment, a neutral platform web service is employed to initiate the change request. The process begins with a request new standard process 324. The standard process change request is requested and the response is reviewed. The change request is defined and a determination is made whether to accept or reject the defined change request If the determination is not to create, update, revise or delete 326 the defined change request, the system creates or uses a freeform process 328 and cancels the change request. The freeform process allows the user to create custom content outside of the library. If the determination is to accept the defined change request, the system initiates a review of the change request for new or revision to standard process 330 to determine the type of change needed; either: create, update, revise or delete 332. The librarian processes the change request, the system facilitates an analysis and librarian would fulfill the request 334.

Combined Librarian and Manufacturing Engineer Roles

FIG. 4 illustrates the manufacturing engineer role and librarian role 400 in the authoritative work instruction authoring system of FIG. 1. In a preferred embodiment, a librarian 102 logs into the work instruction authoring component. A user query 402 queries the process standards management system 130. The user query checks with the user topic query list 408 and a determination to create, update, revise or delete 410 is initiated. If the decision is made to not create, update, revise or delete content, the system proceeds to the structured topic library 412. If the decision is made to create, update, revise or delete content, the system proceeds to the index filter 414 to index a unique process standard topic list and through the mine product definition 416 and on to the process standards management component 130 to filter on unique process standards. The index filter 414 collects filter and indexing information from the structured manufacturing topic list 418 and the structured engineering topic list 422. These lists are combined in the combined engineering and manufacturing index list 420 for use in the index filter 414.

The structured topic lists and the index list will now be more fully described. Manufacturing topic queries define manufacturing process by utilizing the filtering criteria that may be comprised of process categories that are organized by type of process or method and may be based on the engineering topic list including each branch and leaf combination.

This system was designed to capture the structure of manufacturing processes. This is done by analyzing the engineering process requirements that may be represented as unstructured text or metadata within the engineering documents. The system can target key words and phrases and identify them as topics with process threads that can be illustrated in a graphical map as topics with links and relationships. By adding filter parameters and stringing these key words and phrases together, a topic map of process threads hidden within multiple documents may be exposed. The system employs an indexing engine to create and capture manufacturing context while dynamically using an algorithm to create standard processes indexed objects as the topics are being browsed. A user would begin a new search by selecting a primary topic from an engineering topic list and then combining fragments of tags, parameters and attributes; the topic query is temporarily stored and automatically indexed. The search engine would simultaneously search for related topics that are also part of the engineering topic list, a selection of related topics would be displayed to the user and the selection process would continue until the user browses to the topic level that meets their process criteria. Each selection made during a query is indexed and becomes part of the user's topic query history. The resulting selection can be reused by the user or could be designated as a standard process that can be reused.

This method of capturing engineering topics and process requirements found within the engineering documents can be further structured by applying manufacturing process context and dynamically creating work instructions. Utilizing dynamic algorithms to search and find topic relationships provides a guided navigation and selection of the process threads hidden within the documents.

This system can search and find the same topic-based process threads (that humans recognize only after being very familiar with the documents) and the context of the processes and requirements hidden within the text. This method eliminates the human errors and subjective analysis and simultaneously exposes any faults that may exist within a poorly structured document.

The quality of the engineering data being searched is critical. Unstructured documents can be very difficult to search and navigate. Structured documents, based on rules, document templates and a thorough and stringent XML schema can improve the quality and the reusability of the information within the documents. The system may supplement the manual analysis of the engineering specification standards, by systematically exposing inconsistencies within the documents and result in submitting change request for adding XML tags or document restructuring The conversion of engineering process standards to structured XML with tagged elements enhances the ability to find where the data is and improves the chances of recognizing missing tagged fragments, thereby improving document quality.

The collection and indexing of the selection made during the creation of the topic queries captures the process context while the search algorithm is analyzing the data using the predefined rules within the topic index list. The system will also be able to show the structure of the topics and process threads using a graphical map, identification of which threads are topics, XML fragments, or which threads are based on keywords and phrases.

This system's ability to provide a topic map of the process threads will show the user which engineering process standard is the primary topic and which engineering process standards are related. Therefore all of the relationships and requirements may be exposed in a graphical view, rather than a mental exercise in remembering which engineering standard is the authority for which process.

The system will also provide a document (e.g., an Adobe® PDF, etc.) that combines the engineering process standards into a single view rather than multiple documents. The document would be formatted using the same schema as the original engineering document, all sections, paragraphs, sentences, illustrations and tables will be maintained in their original format. This eliminates the fracturing or segmentation of authority document.

The system will also provide an extensible markup language (XML) output of each standard process that has been created by the librarian or by the user. The XML output will be based on a manufacturing method, and the related engineering process standards, combined as simplified, work instructions that reuse the source data that comes directly from engineering standard. Additional manufacturing text may be needed to provide the process context and the timing of the sequence in which the operations arch be executed based on the manufacturing method.

The engineering and manufacturing topic lists will be combined to create a more complete list of key topics for both manufacturing processes and engineering processes. This is done to eliminate interpretation of the engineering processes that are written in the form of requirements rather than executable work instructions. The list will be indexed to improve the overall performance of the system. Changes to the engineering and manufacturing topic lists can be managed independently without impacting access to the combined index list.

Returning now to FIG. 4, query results are viewed 426 and a topic map query based on unique process standard topic definitions for all possible process threads are created in the authoritative manufacturing process view 224, the process standards document view 226 and the process standards Topic MAP view 228. The Topic MAP of all the process standards threads by topic definition list is displayed in the process standards Topic MAP view 228. The process threads may be filtered by each unique process standard topic definition item between the user topic query list 408 and the structured topic library 412. The manufacturing topic list 418 captures and categorizes manufacturing methods topics based on process standard definition topics. The index filter 414 indexes the process standards and manufacturing methods.

User query 402 creates a query based on each manufacturing method topic. The search engine 404 filters the query by standard process topic list. The query may be filtered to target each topic branch of the process standard topic thread between the user topic query list 408 and the structured topic library 412. The index filter 414 indexes the process standard topic branch as a process thread trigger. The query may again be filtered to target each topic branch of the process standard topic thread between the user topic query list 408 and the structured topic library 412 and the index filter indexes the process standard topic leaf as a process thread element. The structured topic library 412 creates and stores indexed query filters based on unique process standard topic branch and leaf elements for all possible process threads.

The process standards Topic MAP view 228 applies the indexed query filter to display engineering specification Topic MAP view of any process standard threads based on a single manufacturing method topic. The process standards document view 226 applies the indexed query filter to display engineering specification document view of any process standard threads based on a single manufacturing method topic.

The authoritative manufacturing process view 224 applies the indexed query filter to display an engineering specification XML document view of any process standard threads based on a single manufacturing method topic.

The index filter 414 may index the manufacturing methods by process and create or modify indexed queries to mine engineering product definition attributes for each manufacturing method topic. The mine product definition 416 filters indexed manufacturing method topic queries to mine engineering product definition attributes using process standard branch and leaf triggers from sample engineering product definitions. If product definitions are mined, the system proceeds to the topic index list or triggers 424. At this point, engineering product definition attribute triggers are added to each filter query to include topic branch and leaf elements. The index filter 414 then indexes the new filter query content for engineering product definition attribute triggers for each indexed manufacturing method topic query. The view query results 426 tests and validates the indexed filter queries for each manufacturing method topic query using the sample product definition. The structured topic library 412 is published and indexed query filters by topic are stored for use by the manufacturing engineer.

The topic triggers are further discussed. The topic index list contains key words, phrases, values, or parameters that trigger the system to search for data found within the engineering process standards, computer-aided design system or manufacturing process planning system.

These topic triggers may be part of the topic query. The topic triggers are accompanied by their related engineering or manufacturing topic, keywords and phrases. These topic triggers may cause an interactive search to launch and retrieve specific information defined by the trigger itself and supported by the topic query search criteria. The topic query tells the search engine what it's looking for, while the topic trigger tells the search engine exactly what value, attribute or parameter needs to be retrieved.

Topic triggers may only be executed within a manufacturing process planning system. The manufacturing plan is comprised of work instruction operations and the engineering product definition. When the work instructions are configured to mine data from the engineering product definition and the engineering process standards, the values, parameters, illustrations, tables and other data will be retrieved using one or more topic triggers.

Returning again to FIG. 4, the manufacturing engineer logs into the product data management component to create a new manufacturing plan. The engineering product definition 146 may be added and the purpose and scope of the manufacturing plan may be defined by the manufacturing as-planned method 148. The manufacturing as-planned method 148 also creates an outline of the manufacturing plan.

The manufacturing engineer then accesses the work instruction authoring component and browses the structured topic library 412. The user query 402 filters and selects a standard process based on a manufacturing method and engineering product definition. The structured topic library 412 allows optionally for the selection of the authoring method. As discussed above, there are at least four methods for authoring the work instructions. Method 1 is the simplest method while methods 2, 3 and 4 are progressively more comprehensive, but require progressively less maintenance. The view query results 426 may be used to preview process standard selection results. The create, update, revise, or delete decision 410 may elect to perform these operations on the standard process. Optionally, a freeform operation may be used that allows the manufacturing engineer to create work instructions outside the system. The view query results 426 are used to select options to add process standard PDF document view and/or Topic MAP view. The manufacturing as-planned method 148 is used to select and apply standard process operations to the manufacturing plan, review the results and update as necessary. Then the manufacturing as-planned method 148 is used to verify the engineering product definition attributes that are displayed within the work instruction text, update as necessary and save the manufacturing plan.

The proxy object is used to gather the search query results as the search is being defined including where the source information criteria came from and which manufacturing plan is using the standard process. A unique index value may be temporally stored and reused each time the search is executed. Each time the search is executed a search algorithm may again find the same triggering branch and leaf matching value based on the matching topic name list.

Figure 5:
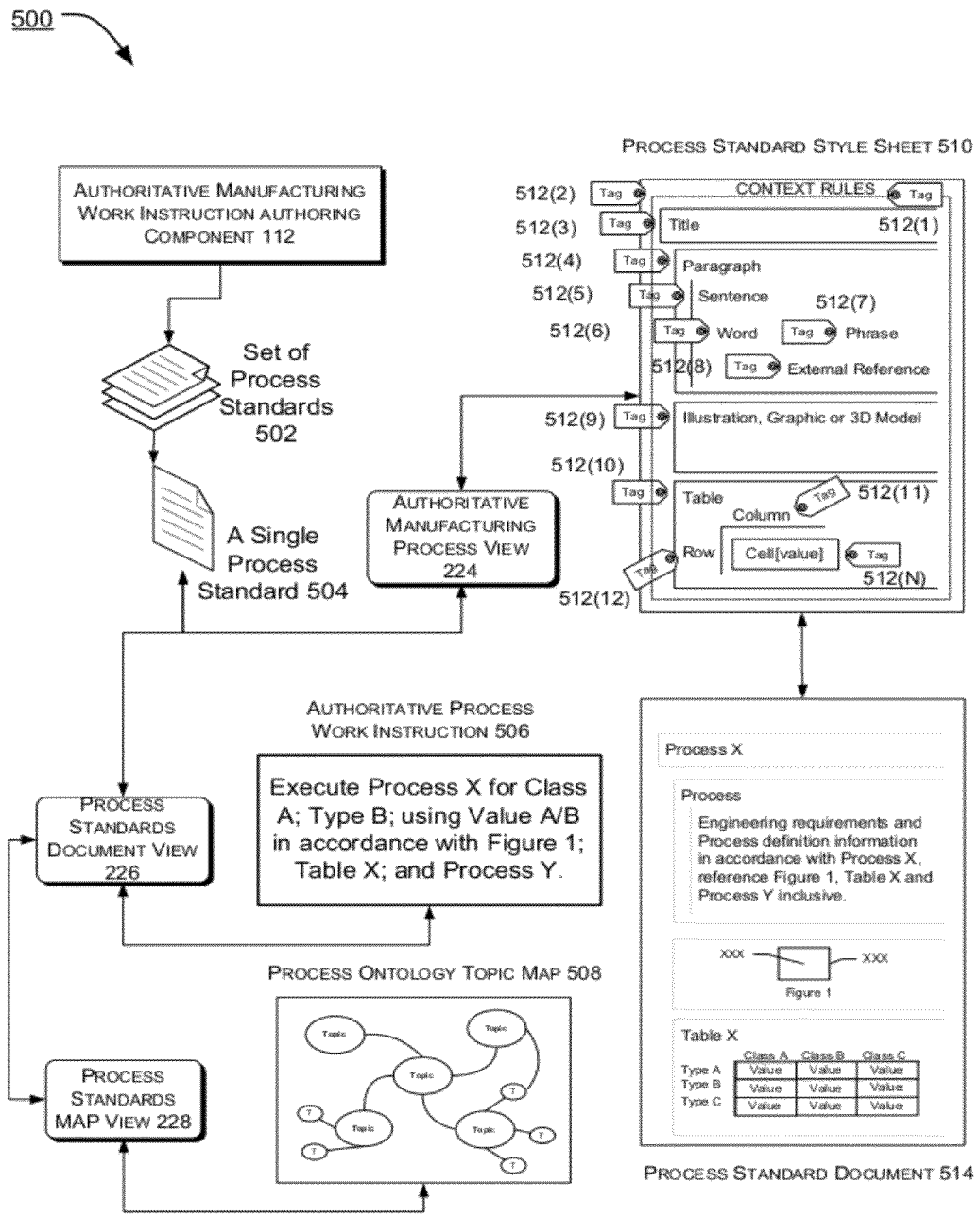
FIG. 5 is a block diagram illustrating the output of the structured topic library.

FIG. 5 illustrates the output of the structured topic library. The authoritative manufacturing work instruction authoring component 112 begins with a set of process standards 502 which may also be a single process standard 504. As discussed above, the authoritative manufacturing process view 224 creates a structured XML document, the process standard style sheet 510. There are various tags 512(1) . . . 512(N) that correspond to fragments in the process standard style sheet 510 or document. The fragments may include, but are not limited to, context rules, title, paragraph, sentence, word, phrase, external reference, illustration, graphic or 3D model, table, row, column and cell. The process standard document 514 shows the document with the embedded fragments.

The process standards document view 226 shows a PDF output. The authoritative process work instruction 506 shows the embedded fragments in the work instruction. The process standards Topic MAP view 228 shows the process ontology topic map 508 in graphical form. All of these outputs may be obtained from the structured topic library.

Figure 6:
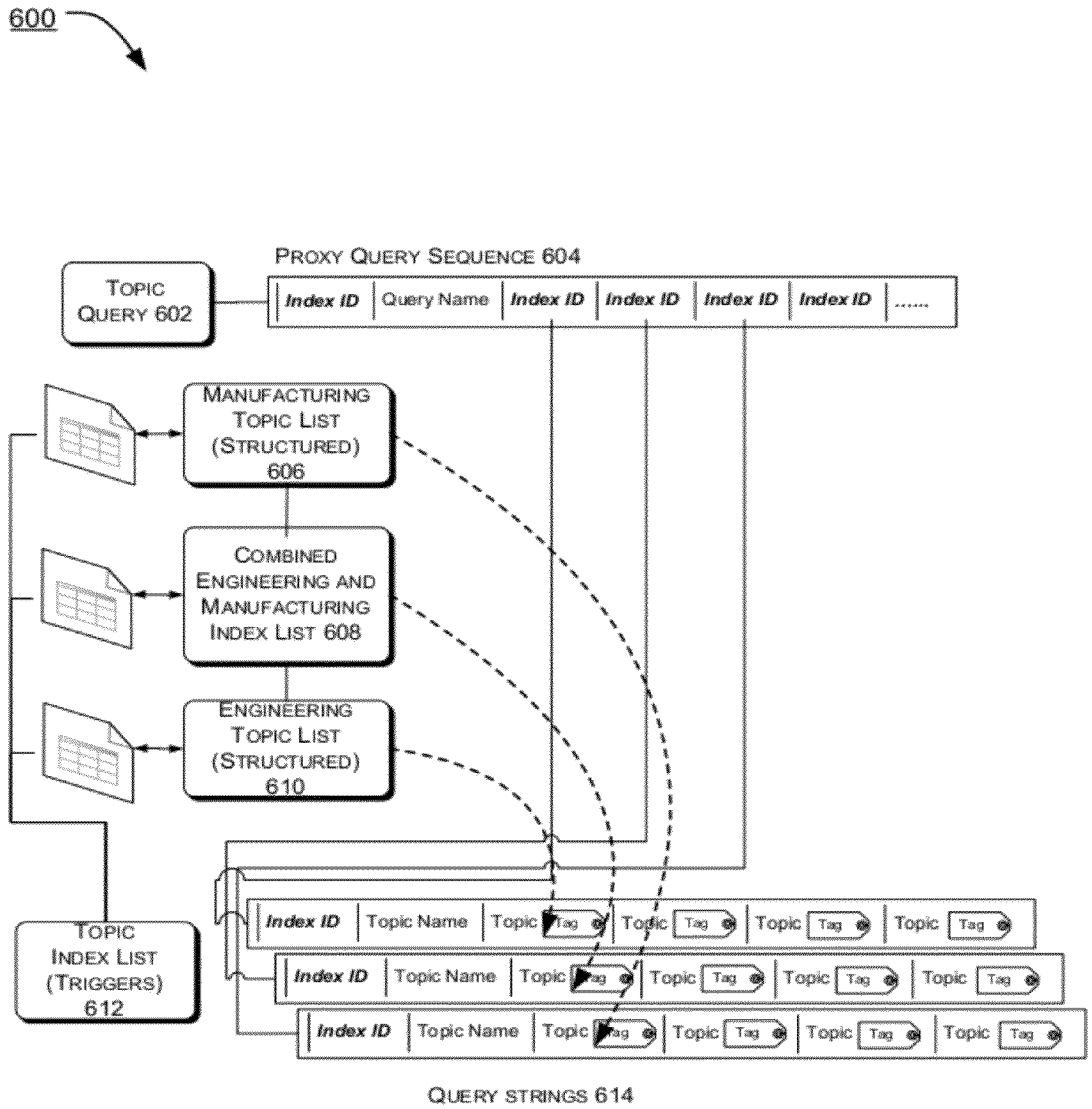
FIG. 6 is a block diagram illustrating the topic query architecture including the indexed topic list, indexed proxy query and topic tagging relationships.

FIG. 6 illustrates the topic query architecture 600. The topic query 602 includes proxy query sequence 604. The manufacturing topic list 606, the engineering topic list 610 and the combined engineering and manufacturing index list 608 are mapped to tags in the topic index list or triggers 612. This provides a method to index the topic queries in the topic query architecture.

Figure 7:
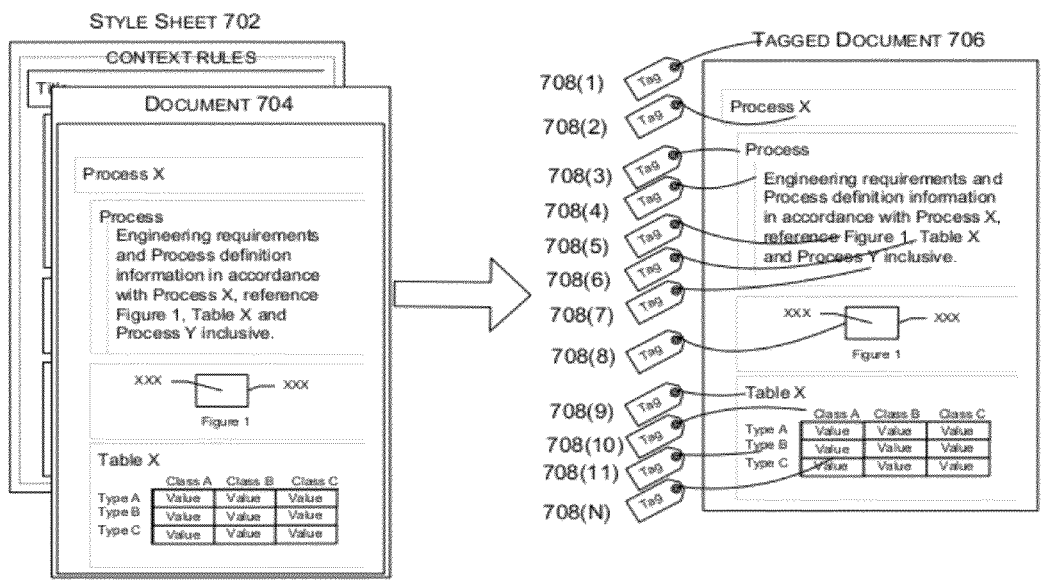
FIG. 7 is a block diagram illustrating the topic query architecture and the elements of the topic tag proxy object.

FIG. 7 further illustrates the architecture 700 of the topic query and the elements of the topic tag proxy object. The style sheet 702 becomes document 704 which is converted to tagged document 706 with tags 708(1) . . . 708(N) correlating to fragments in the document that embed the engineering requirements and process definition information.

Figure 8:
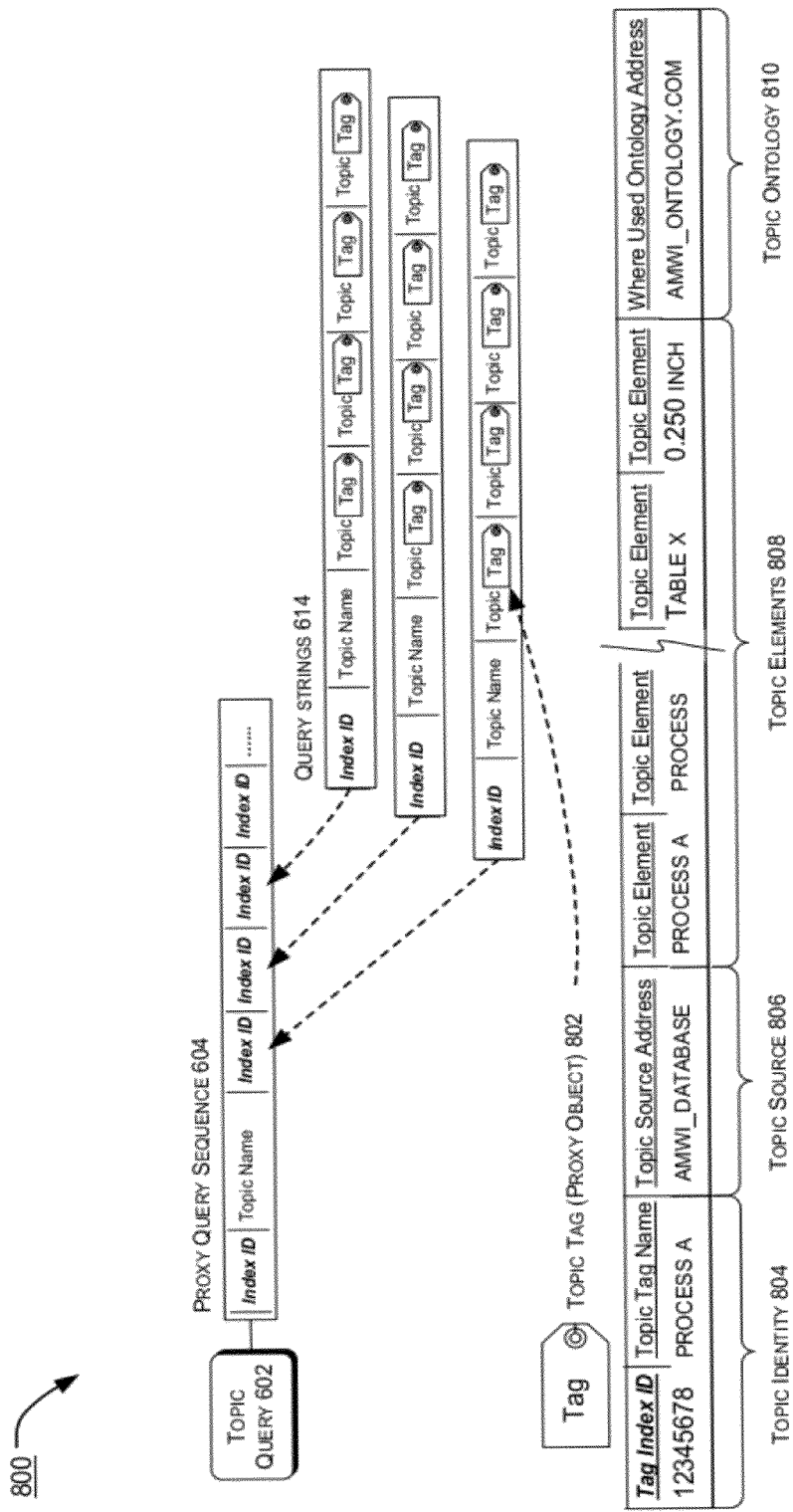
FIG. 8 is a block diagram illustrating the proxy query sequence architecture.

FIG. 8 illustrates the proxy query sequence architecture 800. A new type of proxy has been developed. This proxy object is used to gather the search query results as the search is being defined including where the source information criteria came from and afterwards which manufacturing plan is using the standard process. Each document searched provides the structure of the index engine criteria including the sequence in which it was created. The resulting active search query is stored as a unique ID index of the search criteria that includes the index history of the document being searched and the part or parts of the document that make up the query based on the initial topic list.

Each topic based query uses one or more topic index queries too singularly or in a combined topic string, merge together fragments of information to create work instructions. This method or system is utilized to produce a new type of authoritative work instruction that retrieves and displays text, illustrations, graphics, tables; attribute and other values directly from the authoritative source document by displaying the results on demand in real time.

The structured topic queries provide the means to filter on specific topics and navigate from the root topic to each branch and leaf of the document tree while gathering and indexing the path and each thread along the way. The resulting process threads may be filtered by the user to ultimately define each standard process by each individual process that would make up the whole. In this way a standard process can be captured and defined for a single manufacturing process step or for multiple manufacturing process steps that are to be executed in pre defined sequence.

In FIG. 8, topic query 602 includes proxy query sequence 604. Query strings 614 are indexed to the proxy query sequence 604. The proxy object 802 includes topic identity 804, topic source 806, topic elements 808 and topic ontology 810. The proxy object 802 may be mapped to the individual index IDs in the query strings 614. The indexed proxy query sequence 604 is integral in arriving at the structured topic library that is used by the manufacturing engineer to create the work instructions for the manufacturing plan.

The combined Structured XML proxies are brought together as structured topics that contain XML proxies that have been stored in the correct order (as strings) to form logical phrases in common languages that become the basis of a "structured process".

The "structured process" may be stored as structured XML and is not necessarily fully readable or understandable as a useable work instruction string. The structure process may contain XML proxy strings that are described as pointers or links back to the authoritative source. The XML proxy string may be displayed as a readable proxy string only when the authoring software or delivery software is used to retrieve the source data in the form of text, table values and parameter values. When combined, the software gathers all the information from the proxy strings when used in context with manufacturing process planning and the downstream manufacturing execution system.

The XML library (process library) is created over time by the manufacturing engineer, design engineer and material process engineer. The resulting library contains text strings or proxy objects that are retrieved on demand and always retrieve the source data because no product specific engineering data is stored. The key to this unique relationship is that the processes and governance is always in place through the management of the XML structure of the engineering process specification.

The maintenance of the XML library and manufacturing engineering work instructions that are derived from the library becomes embedded within the change and configuration management policies that are already in place.

If the manufacturing engineer or librarian discovers that the "standard process" is missing a requirement or process step, the engineer my request that the "standard process" be updated or a new version of the "standard process" can be requested. The system "librarian" may assist in updating or creating the "standard process" (validated and released through the change board) and then notifies the engineer when the "standard process" is available. The manufacturing engineer would proceed as normal.

The proxy object is only a mechanism or method that is used to capture very simple common text strings, values, parameters (that are to be mined from the engineering) and store them in such a way (the method) that the individual XML tagged elements (grouping of text, values and parameters) have a unique identity. The key is to simplify the management, and indexing of the uniquely tagged elements of string and value data is by assigning a "proxy" identity that is easy to manage yet, provides a mechanism to capture or deliver information on demand.

There are multiple types of "Proxy" Objects. Some examples are as follows:

1 "Manufacturing Process Proxy"=Manufacturing Process Context that provides manufacturing attributes and the framework of the manufacturing methodology.
2 "Engineering Product Definition Proxy"=Engineering Product Requirements that default to an Engineering Process Specification.
3 "Engineering Process Specification Standard Proxy"=Process Specification Requirements are used by default.
4 "Flagged Manufacturing Attribute Proxy"=Manufacturing Requirements for designated values that override the Engineering Process Specification values or Manufacturing values that temporarily override Engineering Designated values.
5 "Flagged Engineering Attribute Proxy"=Engineering Requirements for designated engineering values that override the Engineering Process Specification values
6 "Parameter Value Proxy"=Process Values as parameters: i.e. attributes that are mined from the any source, engineering, manufacturing or process specifications; shown as [parameter] attributes with software dependencies and restrictions.
7 "Manufacturing Resource Requirements Proxy"=Physical and/or Consumable Resource Requirements: i.e. A Resource required to support the execution of the process or called out by Manufacturing Engineering.
8 "Engineering Resource Requirements Proxy"=Physical and/or Consumable Resource Requirements: i.e. A Resource required or called out by Engineering and/or an Engineering Process Specification.

Figure 9:
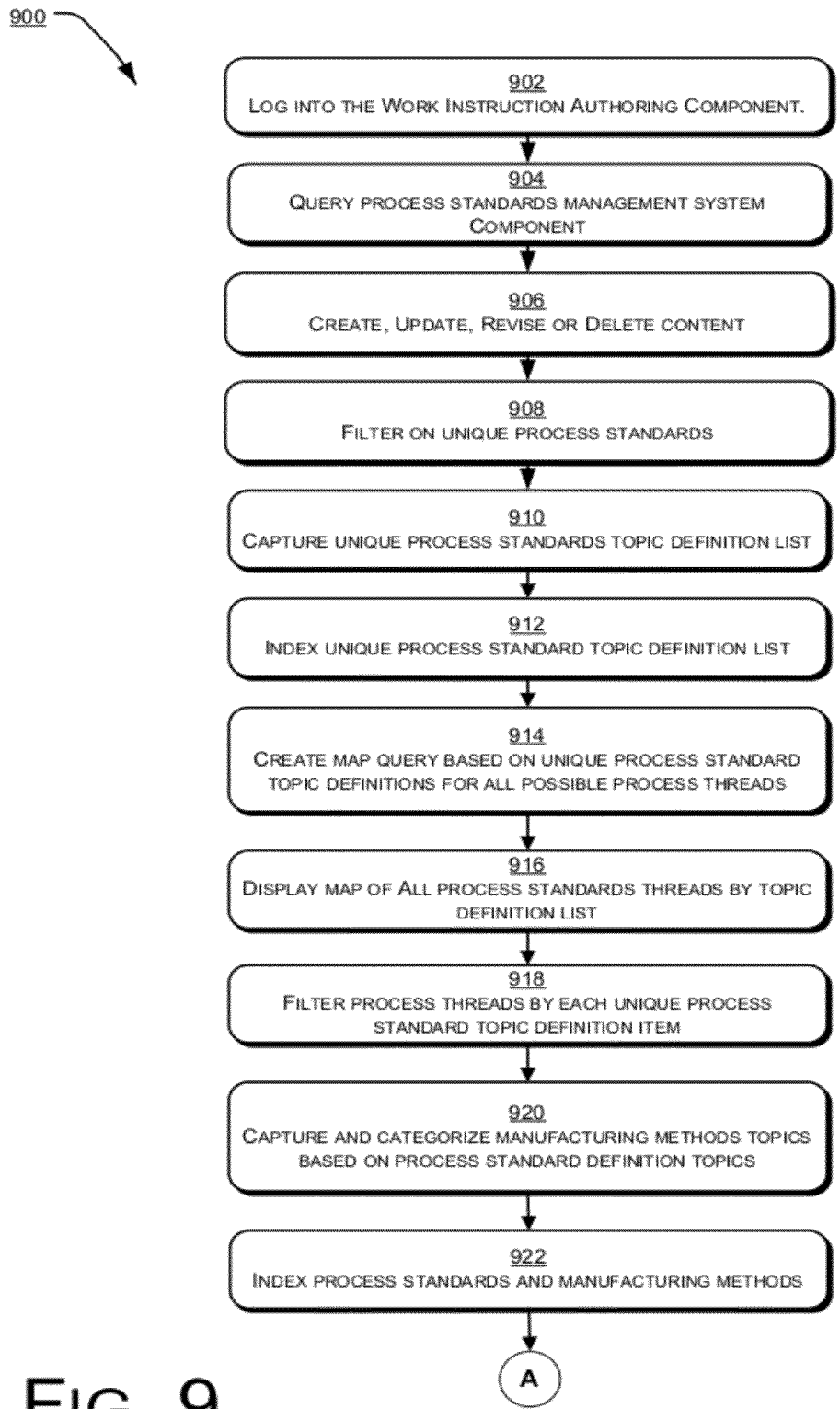
FIGS. 9-11 depict a flow diagram illustrating a process for conducting the librarian role.
Figure 10:
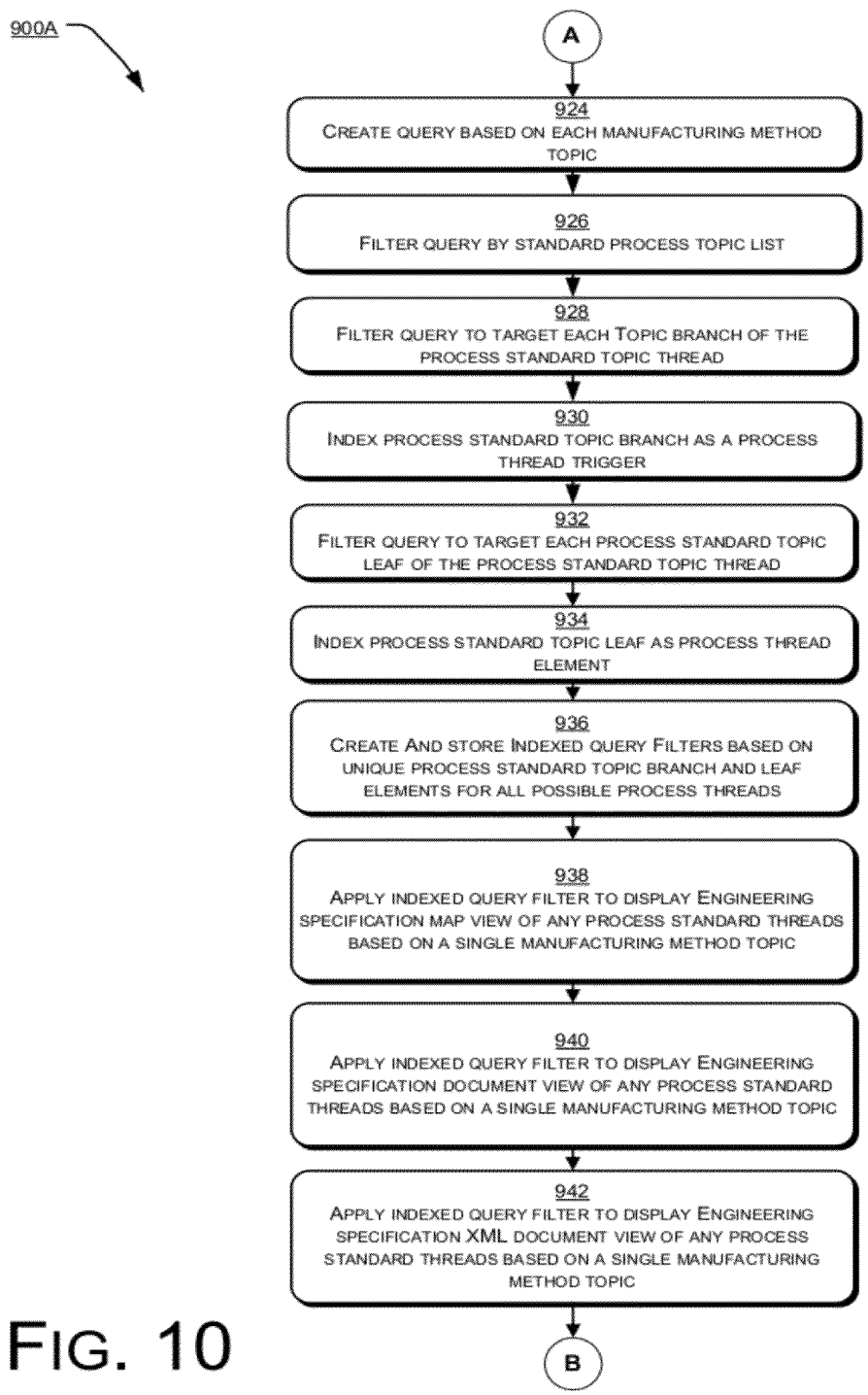
Figure 11:
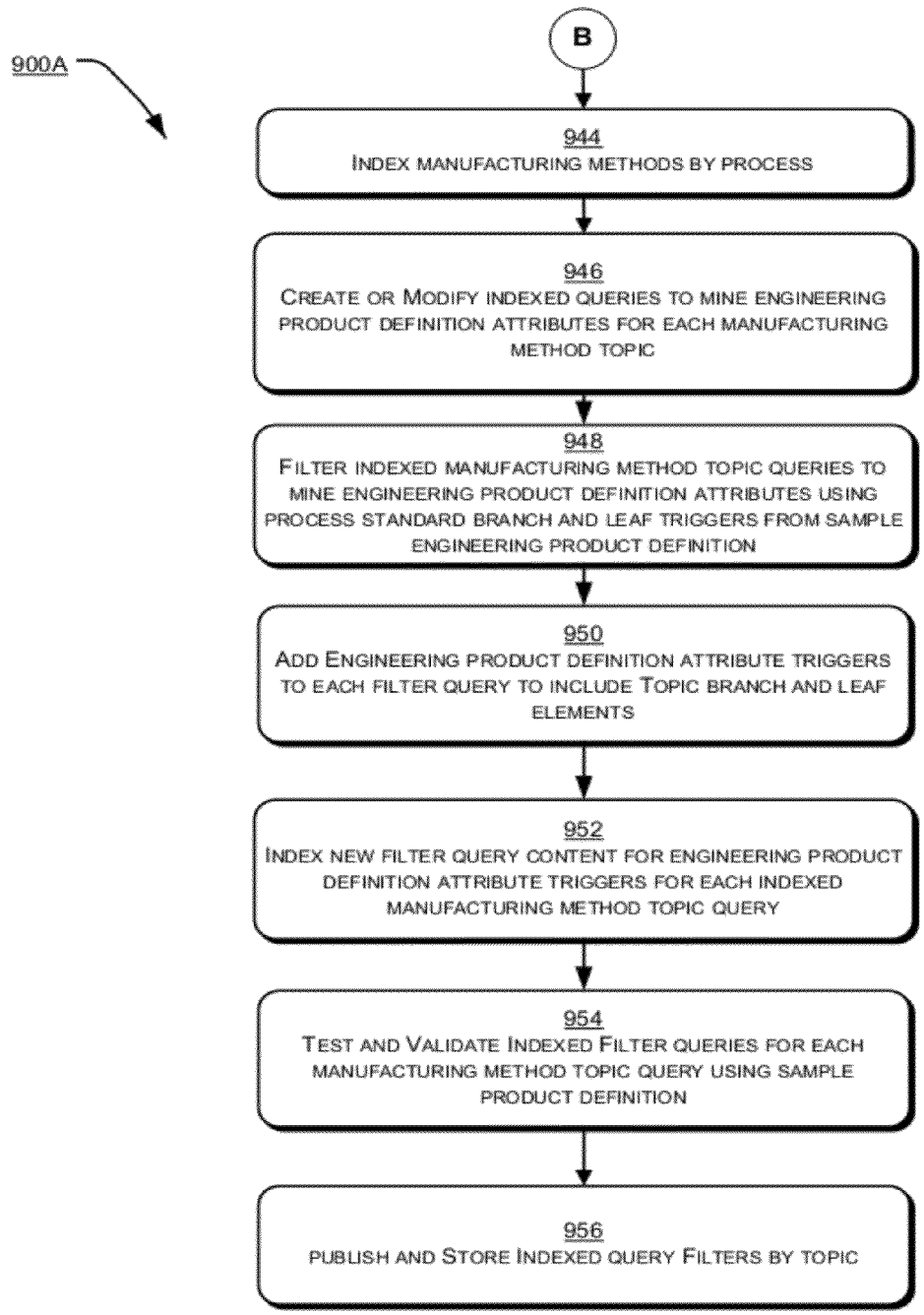

FIGS. 9-11 depict flow diagrams for the authoritative work instruction authoring system from the perspective of the librarian role as described in FIG. 2. In operation 902, the librarian logs into the work instruction authoring component. The system queries the process standards management system component in operation 904. The content is created, updated, revised or deleted in operation 906. A filter on the unique process standards is conducted in operation 908. In operation 910, the unique process standards topic definition list is captured.

Operation 912 indexes the unique process standard topic definition list and operation 914 creates a Topic MAP query based on the unique process standard topic definitions for all possible process threads. Operation 916 displays a topic map of all process standards threads by topic definition list. The process threads are filtered by each unique process standard topic definition item in operation 918. Operation 920 captures and categorizes manufacturing methods topics based on process standard definition topics. In operation 922, the process standards and manufacturing methods are indexed. Operation 924 (FIG. 10) creates a query based on each manufacturing method topic. The query is filtered by the standard process topic list in operation 926, while operation 928 filters the query to target each topic branch of the process standard topic thread.

Operation 930 indexes the process standard topic branch as a process thread trigger. Operation 932 filters the query to target each process standard topic leaf of the process standard topic thread. The process standard topic leaf is indexed as a process thread element in operation 934. Operation 936 creates and stores the indexed query filters based on unique process standard topic branch and leaf elements for all possible process threads.

Operation 938 applies the indexed query filters to display an engineering specification topic map view of any process standard threads based on a single manufacturing method topic. Operation 940 applies the indexed query filter to display an engineering specification document view of any process standard threads based on a single manufacturing method topic. Operation 942 applies the indexed query filter to display an engineering specification XML document view of any process standard threads based on a single manufacturing method topic. Operation 944 (FIG. 11) indexes the manufacturing methods by process. The indexed queries are created or modified in operation 946 to mine engineering product definition attributes for each manufacturing method topic. Operation 948 filters the indexed manufacturing method topic queries to mine engineering product definition attributes using process standard branch and leaf triggers from sample engineering product definition.

Engineering product definition attribute triggers are added to each filter query to include topic branch and leaf elements in operation 950. Operation 952 indexes new filter query content for engineering product definition attribute triggers for each indexed manufacturing method topic query. The indexed filter queries are tested and validated for each manufacturing method topic query using sample a product definition in operation 954. Operation 956 publishes and stores the indexed query filters by topic.

Figure 12:
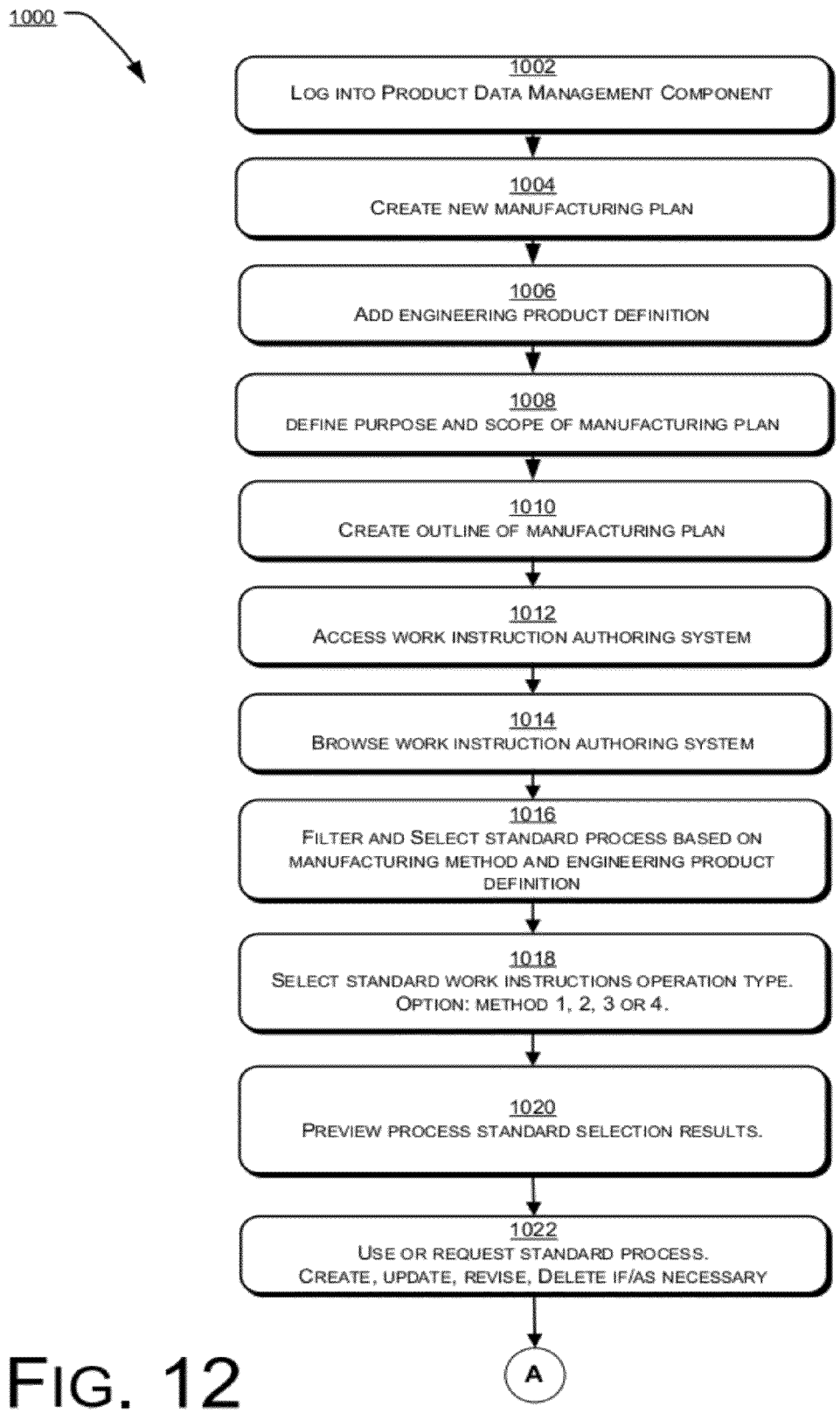
FIGS. 12-13 depict a flow diagram illustrating a process for conducting the manufacturing engineering role.
Figure 13:
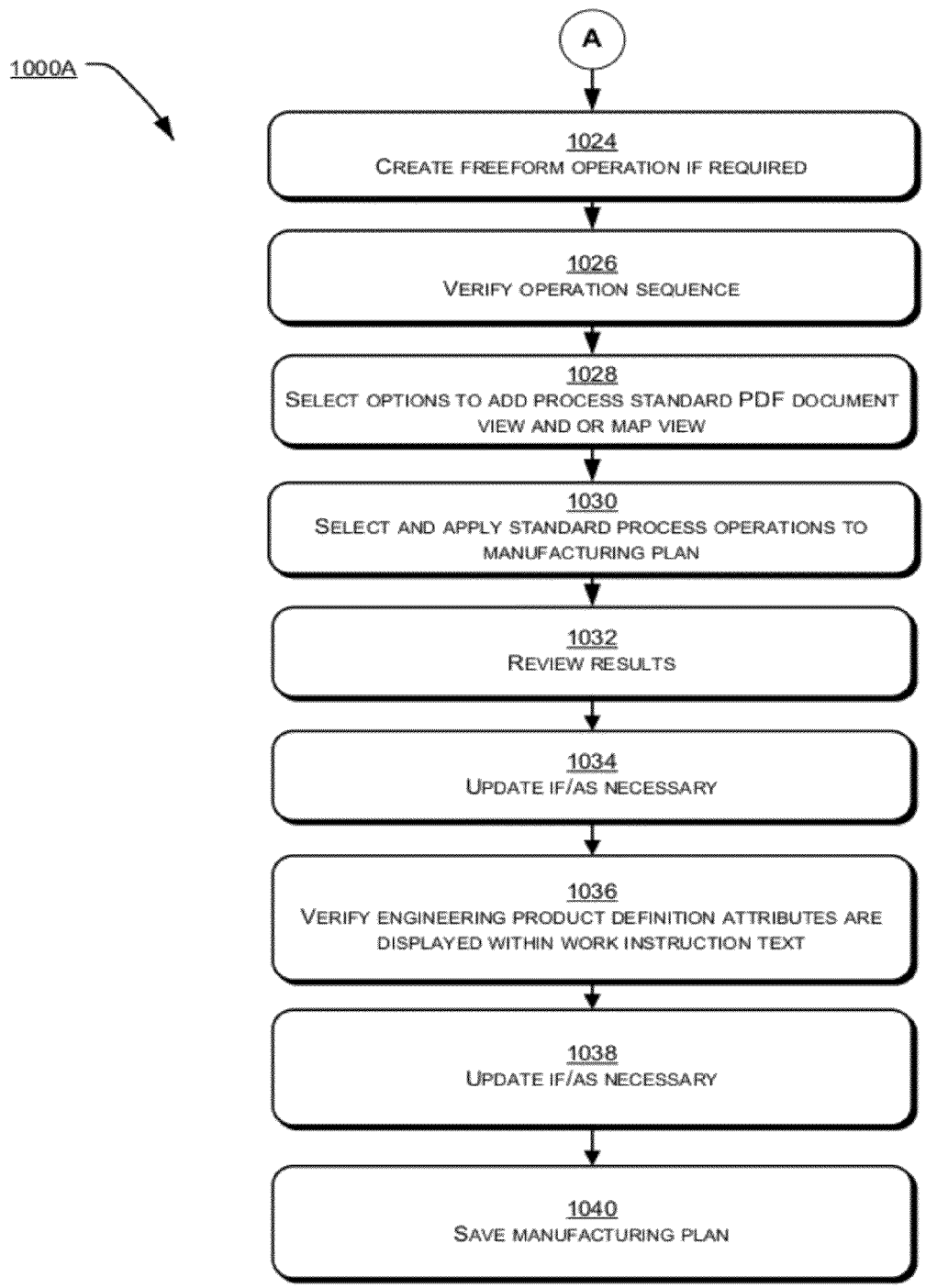

FIGS. 12-13 depict flow diagrams for the authoritative work instruction authoring system from the perspective of the manufacturing role as described in FIG. 3. In operation 1002, the manufacturing engineer logs into the product data management component. A new manufacturing plan is created in operation 1004. Engineering product definitions are added in operation 1006. A purpose and scope of the manufacturing plan is defined in operation 1008 and an outline of the manufacturing plan is created in operation 1010. In operation 1012 the work instruction authoring system is accessed. The work instruction authoring system is browsed in 1014 and a standard process based on manufacturing methods and engineering product definitions is filtered and selected in operation 1016. In operation 1018, the work instructions operation type is selected. At this point, the system may optionally provide the choice of selecting one of methods 1, 2, 3 and 4 described above.

The process standard selection results are previewed in operation 1020. In operation 1022, a standard process is used or requested and is created, updated, revised or deleted as necessary. Operation 1024 (FIG. 13) creates a freeform operation if it is necessary. The operation sequence is verified in operation 1026. In operation 1028, options are selected to add a process standard PDF document view and/or a Topic MAP view. In operation 1030, the standard process operations to the manufacturing plan are selected and applied. The results are reviewed in operation 1032 and updated as necessary in operation 1034. The engineering product definition attributes are verified and displayed within the work instruction text in operation 1036 and updated as necessary in operation 1038. The manufacturing plan is saved in operation 1040.

The functions and processes described herein are represented by a sequence of operations that can be implemented by or in hardware, software, or a combination thereof. In the context of software, the blocks represent computer executable instructions that are stored on computer readable media and that when executed by one or more processors perform the recited operations and functions. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For instance, the components can include, but are not limited to, one or more processors (e.g., any of microprocessors, controllers, and the like), a system memory, and a system bus that couples the various system components. The one or more processors process various computer executable instructions to control the operation of the computing device and to communicate with other electronic and computing devices. The system bus represents any number of several types of bus structures, including a memory bus or memory controller, a peripheral bus, an accelerated graphics port, and a processor or local bus using any of a variety of bus architectures.

The system may include a variety of computer readable storage media which can be any media that is accessible by a computing device and includes both volatile and non-volatile media, removable and non-removable media. The system memory includes computer-readable storage media in the form of volatile memory, such as random access memory (RAM), and/or non-volatile memory, such as read only memory (ROM).

The computing device may include other removable/non-removable, volatile/non-volatile computer storage media. By way of example, a hard disk drive may read from and write to a non-removable, non-volatile magnetic media, a magnetic disk drive may read from and write to a removable, non-volatile magnetic disk (e.g., a "floppy disk"), and an optical disk drive may read from and/or write to a removable, non-volatile optical disk such as a CD-ROM, digital versatile disk (DVD), or any other type of optical media.

Any number of program modules may be stored on the hard disk, magnetic disk, optical disk, ROM, and/or RAM, including by way of example, an operating system, one or more application programs, other program modules, and program data. Each of such operating system, application programs, other program modules, and program data (or some combination thereof) may include an embodiment of the systems and methods described herein.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method for dynamically creating a topic based proxy, the method comprising:
    collecting a plurality of search query results as a search is being defined from a query, the collecting including an indication of an origin of source information criteria used to collect the plurality of search query results and a location for a work instruction output usage within a manufacturing plan;
    creating a plurality of structured topic queries based, at least in part, on the search query results, the plurality of structured topic queries configured to provide filtering for specific topics and navigation;
    forming a topic structure using a query source identified during a search of a document; and
    creating an authoritative work instruction that retrieves and displays the results of the topic structure in real time or near real time.

2. The method of claim 1, wherein the plurality of structured topic queries are configured to provide a structure of an index engine including the sequence in which it is created.

3. The method of claim 1, wherein the plurality of structured topic queries are configured to store a unique index of the source information criteria, the source information criteria including an index history of a document being searched and, based on an initial topic list, an identification of a portion of the document that is equivalent to the query.

4. The method of claim 1, wherein creating the authoritative work instruction comprises, for each topic based proxy, using the plurality of structured topic queries to merge together fragments of information to create the authoritative work instruction, either singularly or in a combined topic string.

5. The method of claim 1, wherein the creating the authoritative work instruction further comprises retrieving and displaying text, illustrations, graphics, tables; attributes and other values directly from an authoritative source document on demand in real time.

6. The method of claim 1, wherein the structured topic queries are further configured to filter a plurality of specific topics and navigate from a root topic to each branch and each leaf of a document tree during a collecting and an indexing of a path and each thread to create a plurality of process threads.

7. The method of claim 6, wherein the plurality of process threads are filtered by a user to define a standard process and an individual process and further wherein the standard process is captured and defined for a plurality of manufacturing process steps that are executed in a predefined sequence.

8. A method for dynamically creating work instructions comprising:

converting a set of documents to structured XML files and a plurality of tagged elements to create a library;

utilizing filter criteria to define manufacturing process to be completed;

accessing a web service to apply the filter criteria to identify current files from the library applicable to the manufacturing process;

selecting and applying the current files to a plan; and using the plan to complete the manufacturing process.

9. The method of claim 8, further comprising comparing the current files applicable to the manufacturing process and the plan to verify a set of requirements for the plan.

10. The method of claim 9, further comprising updating the current files in the event one or more of the set of requirements is missing.

11. The method of claim 8, further comprising tracking the structured XML files and the plurality of tagged elements to determine the location of the structured XML files and to recognize missing tagged elements.

12. The method of claim 8, further comprising providing a topic map illustrating relationships, including a structure and a graphical map of a plurality of threads.

13. The method of claim 8, further comprising identifying which of the plurality of threads are fragments and which are based on a keyword.

14. The method of claim 8, further comprising utilizing a dynamic algorithm that collects context data from the library while the dynamic algorithm conducts an analysis.

15. The method of claim 8, further comprising adding enhancements to the plurality of tagged elements.

16. A method for capturing an authoritative work instruction, the method comprising:

creating a plurality of structured topic queries, the plurality of structured topic queries configured to provide filtering for specific topics and navigation;

filtering a plurality of topic query threads to define a plurality of topic queries;

defining a standard process using a subset of the plurality of topic queries and saving the standard process as a structured topic query; and creating the authoritative manufacturing work instruction.

17. The method of claim 16, wherein the plurality of structured topic queries are configured to filter a plurality of specific topics.

18. The method of claim 16, wherein the plurality of structured topic queries are configured to navigate from a root of each of the plurality of structured topic queries to each branch and leaf of a topic tree while gathering and indexing a path for each topic thread.

19. The method of claim 16, wherein the authoritative work instruction is created for a single manufacturing process or for a plurality of manufacturing processes.

20. The method of claim 16, wherein the authoritative work instruction defines an ontology that is based on the plurality of structured topic queries.

\* \* \* \* \*